Nov. 11, 1941.                J. PTAK                2,262,200
                              NUT LOCK
                         Filed June 10, 1940
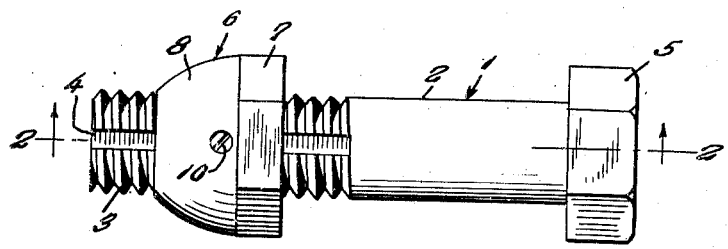
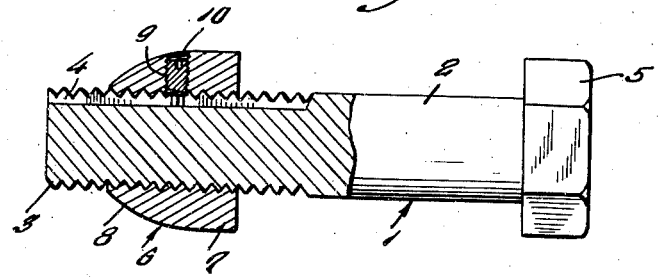
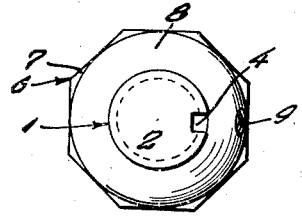      
Inventor
Joseph Ptak
By Clarence A. O'Brien
Attorney

UNITED STATES PATENT OFFICE 2,262,200
NUT LOCK
Joseph Ptak, Chicago, Ill.
Application June 10, 1940, Serial No. 339,777
1 Claim. (Cl. 151—24)

The present invention relates to new and useful improvements in nut locks and has for its primary object to provide, in a manner as hereinafter set forth, coacting means of a novel construction and arrangement in a nut and bolt for positively securing the former against loosening from vibration or other causes.

Another very important object of the invention is to provide a nut lock wherein the nut may be removed when desired.

Other objects of the invention are to provide a nut lock of the character described which will be comparatively simple in construction, strong, durable, attractive in appearance and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is an elevational view of a nut lock constructed in accordance with the present invention.

Figure 2 is a view principally in longitudinal section through the device, taken substantially on the line 2—2 of Fig. 1.

Figure 3 is an end elevational view.

Figure 4 is a view in end elevation of the set screw.

Figure 5 is a cross sectional view through an end portion of the set screw.

Referring now to the drawing in detail, it will be seen that the embodiment of the invention which has been illustrated comprises a bolt of suitable metal which is designated generally by the reference numeral 1. The bolt 1 includes a shank 2 having a threaded end portion 3 provided with a longitudinal groove or channel 4. On the other end of the shank 2 is a head 5.

Threadedly mounted on the portion 3 of the bolt 1 is a nut which is designated generally by the reference numeral 6. The nut 6 includes a polygonal inner portion 7 adapted to receive a wrench or other suitable actuating tool. The nut 6 further includes a substantially dome shaped or rounded outer portion 8.

The portion 8 of the nut 6 has formed therein a radial threaded opening 9. The opening 9 is for the reception of a set screw 10. The set screw 10 comprises a reduced, unthreaded inner end portion 11 of triangular cross section which is engageable in the groove or channel 4 of the bolt 1. It may be well to here state that the bolt 1 may be provided with two or more grooves 4 and that the nut 6 may comprise two or more set screws 10.

It is thought that the manner in which the nut lock functions will be readily apparent from a consideration of the foregoing. Briefly, with the set screw 10 retracted in the opening 9, the nut 6 is threaded on the portion 3 of the bolt 1 and tightened. The nut 6 is adjusted to bring the set screw 10 into registry with the groove 4. The set screw 10 is then threaded inwardly in the opening 9 for engaging the triangular end portion 11 of said set screw in the groove 4, thus positively locking said nut against turning on the bolt. Of course, when it is desired to turn the nut 6 again the set screw 10 is disengaged from the groove 4.

It is believed that the many advantages of a nut lock constructed in accordance with the present invention will be readily understood and although a preferred embodiment of the device is as illustrated and described, it is to be understood that changes in the details of construction may be resorted to which will fall within the scope of the invention as claimed.

What is claimed is:

A nut lock comprising a threaded bolt having a longitudinal groove therein, a nut threadedly mounted on said bolt, and a set screw threadedly mounted in the nut, said set screw including an inner end portion of triangular cross-section engageable in the groove for locking the nut against turning on the bolt, said triangular end portion providing a plurality of flat faces selectively engageable with one of the side walls of the groove for preventing said set screw from backing out of the nut.

JOSEPH PTAK.